No. 737,173. PATENTED AUG. 25, 1903.
J. D. TIMMERMAN.
LIGHTNING PROTECTOR.
APPLICATION FILED MAY 14, 1903.
NO MODEL.
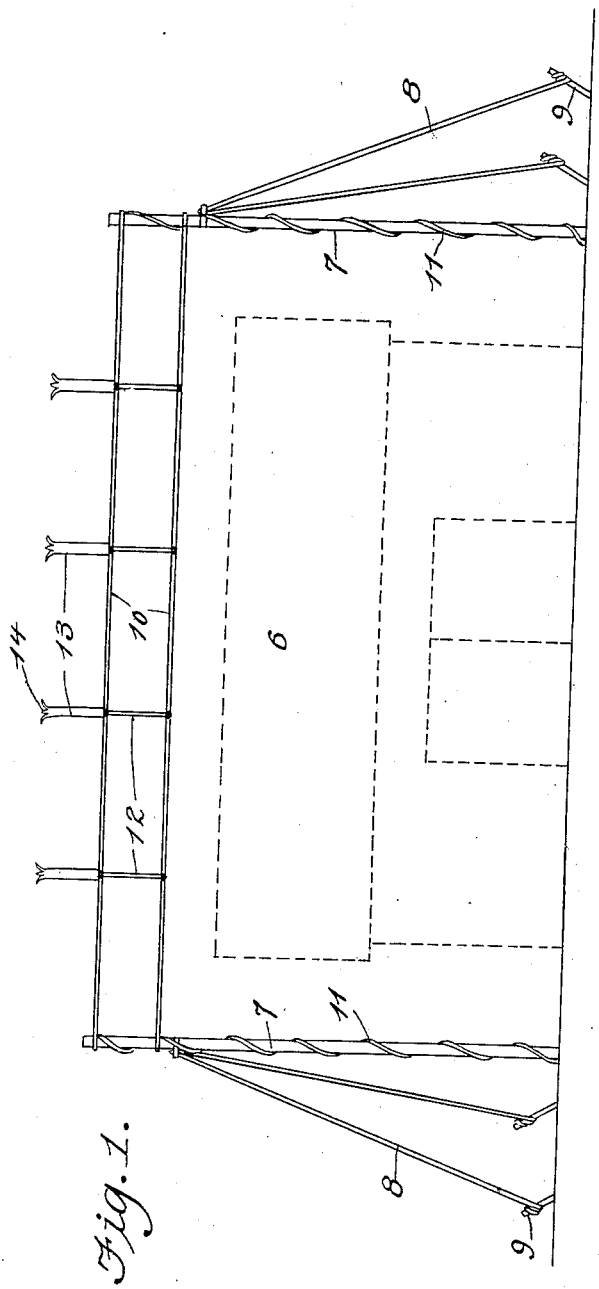
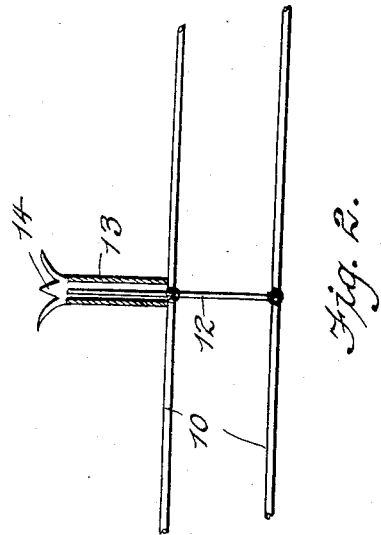

No. 737,173. Patented August 25, 1903.

UNITED STATES PATENT OFFICE.

JASON D. TIMMERMAN, OF STONE MILLS, NEW YORK.

LIGHTNING-PROTECTOR.

SPECIFICATION forming part of Letters Patent No. 737,173, dated August 25, 1903.

Application filed May 14, 1903. Serial No. 157,074. (No model.)

*To all whom it may concern:*

Be it known that I, JASON D. TIMMERMAN, a citizen of the United States, residing at Stone Mills, in the county of Jefferson and State of New York, have invented certain new and useful Improvements in Lightning-Protectors; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates particularly to that kind of lightning-protectors having an electrical conductor suspended above the building and adapted to receive the electric current and conduct the same to the ground.

The object of the invention is to produce an improved structure of the kind stated, as will be more fully apparent from the following description and claim.

In the accompanying drawings, Figure 1 is an elevation of the invention applied to a building, and Fig. 2 is a section of one of the tips or terminals for the conductor-wires.

Referring specifically to the drawings, the building to be protected is indicated at 6. Vertical posts 7, preferably made of galvanized-iron tubes, are set firmly in the ground on opposite sides of the building and are supported by guy-wires 8, secured to iron posts 9, driven in the ground. At 10 are indicated a pair of parallel horizontal wires, which extend between the posts above and across the building and are connected to wires 11, which are wound around the posts, to the ground. The horizontal wires are in vertical alinement. At intervals along the horizontal wires are a series of vertical wires 12. These are joined to both horizontal wires and project above the upper wire. The two horizontal wires, with the vertical wires joined thereto, afford a larger conductor than a single wire and also a more rigid structure, because the vertical wires by connection with both horizontal wires are sustained in vertical position with less liability to be blown or bent over than if they were connected to one wire only. At 13 are indicated tubular tips placed over the projecting ends of the wires 12. These tubes rest on the upper wire 10 and are formed at the top into a number of flaring points 14. The tube is preferably formed of copper or of other metal coated with copper or silver, and the points are bright and sharp to more readily take the electrical fluid.

The conductor above described may be with great utility applied to oil-tanks, powder-magazines, and the like, but is useful in the protection of any kind of buildings.

What I claim as new, and desire to secure by Letters Patent, is—

In a lightning-protector, the combination with the structure to be protected, of conducting-posts on opposite sides thereof, several parallel horizontal wires strung in vertical alinement between the tops of the posts, above the structure, a series of vertical wires connected between the posts to all the horizontal wires and projecting above the same, and metallic tubes over the vertical wires, resting on the upper horizontal wire, and having flaring points at the top.

In testimony whereof I affix my signature in presence of two witnesses.

JASON D. TIMMERMAN.

Witnesses:
 HAROLD L. HOOKER,
 WILLIAM W. NERULD.